United States Patent [19]

Muraishi

[11] Patent Number: 4,995,637
[45] Date of Patent: Feb. 26, 1991

[54] MOTOR VEHICLE WORK PLATFORM

[76] Inventor: Noboru Muraishi, P.O. Box 31683, Aurora, Colo. 80041

[21] Appl. No.: 453,788

[22] Filed: Dec. 20, 1989

[51] Int. Cl.⁵ .............................................. B60P 1/43
[52] U.S. Cl. .................................. 280/727; 108/44; 248/447.2
[58] Field of Search ............ 200/727; 248/444, 447.1, 248/447.2, 454; 108/44

[56] References Cited

U.S. PATENT DOCUMENTS

| | | | |
|---|---|---|---|
| 4,453,788 | 6/1984 | Russell | 248/447.1 |
| 4,749,161 | 6/1988 | Falcone | 248/447.2 |
| 4,805,867 | 2/1989 | McAllister | 248/454 |
| 4,915,035 | 4/1990 | Clark et al. | 248/444 |

Primary Examiner—Kenneth R. Rice
Attorney, Agent, or Firm—Brian D. Smith

[57] ABSTRACT

A work platform for mounting on the steering wheel of a motor vehicle is disclosed. The platform has a generally flat underside and a top side which defines a generally flat writing surface. The platform also includes securing means for engaging the outer rounded edge of a steering wheel to mount the work platform on the steering wheel.

16 Claims, 2 Drawing Sheets

MOTOR VEHICLE WORK PLATFORM

TECHNICAL FIELD

The invention relates generally to work platforms such as clipboards and, more specifically, to a work platform for use in a motor vehicle as a writing surface.

BACKGROUND ART

While numerous work platforms such as desks, work benches and clipboards have been developed over the years, a work platform which is usable in motor vehicle has not, as far as is known, yet been developed. Such a device would find widespread use with people who work on the road such as salesmen, truck drivers, construction workers and others who work away from the office and need a surface to write upon in their automobile. Such a device would also be of value to members of the general public who occasionally need a surface to write upon in their automobile.

DISCLOSURE OF THE INVENTION

The present invention addresses the aforementioned needs by providing a generally rigid, work platform which can be mounted on or secured to the steering wheel of a motor vehicle. The work platform has a generally flat underside and a top side defining a generally flat writing surface. The work platform also has securing or attaching means for engaging the steering wheel to mount the work platform on the steering wheel.

The securing means preferably includes an elongated member which is attached to the underside of the work platform and which projects outwardly therefrom at approximately a right angle. The elongated member also has an inner surface which faces inwardly towards the normal axis of the work platform and an outer facing surface which faces away from the normal axis of the work platform. The inner surface of the elongated member is sized and configured to rest or abut against the rounded outer edge of the top of the steering wheel so as to secure or mount the work platform to the steering wheel, i.e., when the work platform is placed on the steering wheel with the underside thereof lying flat against the steering wheel.

In a preferred embodiment, the inner surface of the elongated member is concave in cross-section so as to generally conform to the rounded outer edge of the steering wheel. The work platform also preferably includes a ledge means or projection attached to the writing surface thereof for preventing articles from sliding off the writing surface. Clip means attached to the writing surface may also be provided for securing articles such as sheets of paper to the work platform.

BRIEF DESCRIPTION OF THE DRAWINGS

Other features of this invention will appear in the following description and appended claims, reference being made to the accompanying drawings forming a part of the specification where like reference characters designate corresponding parts in the views.

BEST MODE FOR CARRYING OUT THE INVENTION

Figure 1:
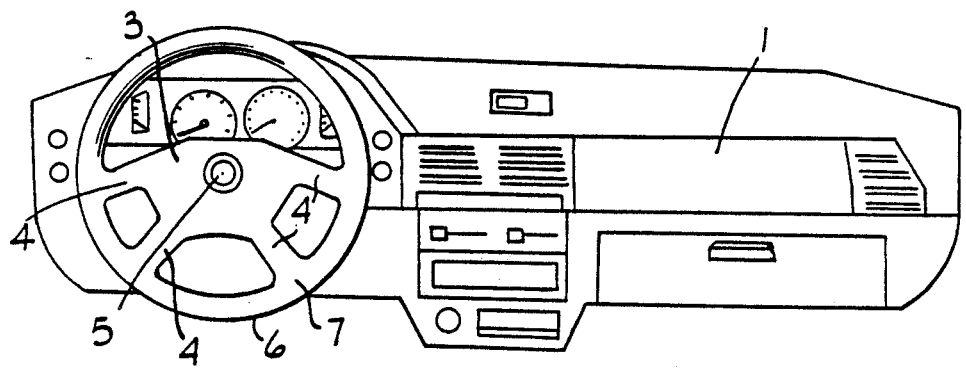
FIG. 1 is a front elevational view of a dashboard and steering wheel found inside a typical modern day automobile.
Figure 2:
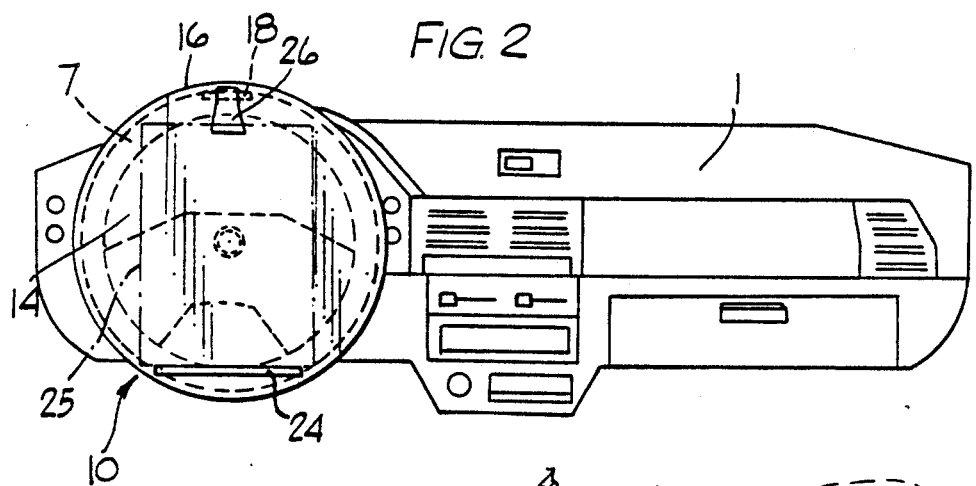
FIG. 2 is a front elevational view of the dashboard of FIG. 1 which additionally shows a work platform of the present invention mounted on the steering wheel of FIG. 1. A sheet of paper lying on the writing surface of the work platform is also illustrated.

FIG. 1, as previously mentioned, illustrates a dashboard 1 and steering wheel 2 of a typical modern day automobile. Steering wheel 2 includes a hub section 3 having four support legs 4 which attach the steering wheel to the hub section, which, in turn, is attached to a conventional steering column 5. Steering wheel 2 is conventional in that it has a generally rounded edge 6 and a generally planar surface referred to herein as support surface 7 which faces the driver of the motor vehicle.

FIGS. 2 through 6 illustrate a work platform 10 of the present invention. The platform generally includes a rigid base preferably a sheet 11 of rigid material. Sheet or base 11 is also sometimes referred to herein as the platform. The platform's base or sheet is made from a rigid material so that it can be used a writing surface. Suitable rigid materials from which sheet 11 can be made include hard plastics, metals, preferably a light metal, and/or rigid cardboard sheet material.

As illustrated in the Figures, platform 10 (or sheet 11 as sometimes referred to herein) has a generally flat underside 12 and a generally flat top side (not numbered). The top side, in turn, defines a generally flat writing surface 14. The platform also has an edge 16 which extends about the platform's periphery and which connects underside 12 and writing surface 14.

Platform 10 also includes an elongated member 18 or securing means having an inner surface 20 and an outer surface 22. The elongated member is attached to underside 12 of the platform or sheet at a location proximate edge 16 of the platform. Elongated member 18 is also attached to underside 12 so as to project outwardly therefrom at an angle approximating 90 degrees. Elongated member 18 is further oriented with respect to the center or normal axis A of the platform (see FIG. 6) so that inner surface 20 thereof faces inwardly towards normal axis A. Thus, outer surface 22 of elongated member 18 faces away from normal axis A. It can also be seen in FIG. 6 that inner surface 20 is concave in cross section so that it generally conforms to the shape of rounded edge 6 of the steering wheel.

Work platform 10 also includes a ledge means or projection 24 for preventing articles such as books (or a sheet of paper 25, as illustrated) from sliding off the writing surface when the work platform is mounted on the steering wheel. Projection 24 is generally longitudinally extending and attached to writing surface 14 at a location near edge 16 of the platform. It is also oriented or positioned on writing surface 12 so that its longitudinal axis is generally parallel to the longitudinal axis of elongated member 18.

Work platform 10 also includes a clip means 26 attached to writing surface 12 for securing articles such as paper sheet 25 or a tablet to the writing surface. The clip means includes conventional spring means for biasing or urging the clamp means against the writing surface. As such, an article can be secured to the writing surface by placing it between the clip means and the writing surface which, thus, clamps the article to the writing surface.

As illustrated in the drawings, sheet 11 is a one piece, integral unit and cannot, as such, be folded. It may, however, be desirable to be able to fold platform 10 in some circumstances inasmuch as a foldable work platform would be easier to store. Such a foldable work platform is considered to be within the scope of the present invention and could be provided, for example, by simply cutting or dividing sheet 11 in half and connecting the two halves together with some sort of hinge means. Such a foldable work platform when mounted on a steering wheel would, as will be described below, still provide a rigid, surface for writing.

Figure 3:
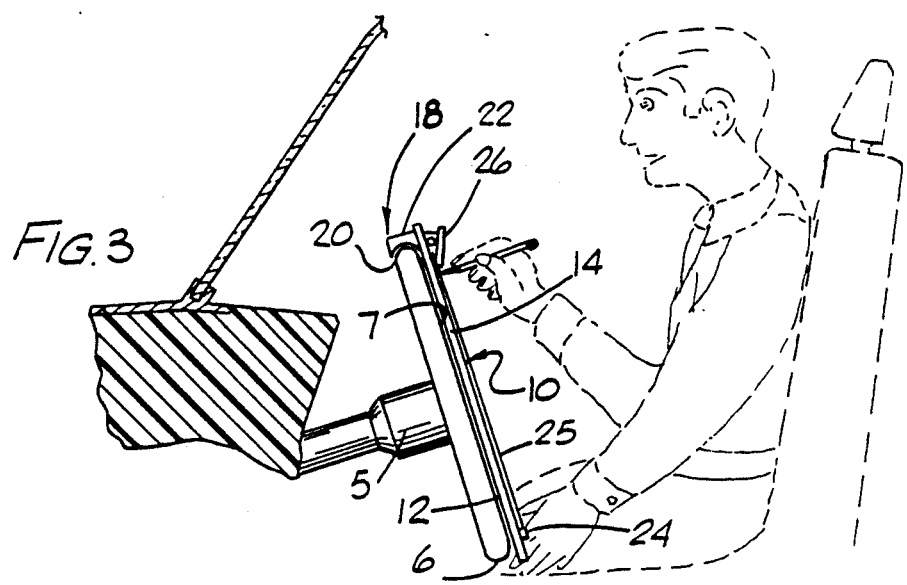
FIG. 3 is a side elevational view of the dashboard, steering wheel and work platform of FIG. 2 which additionally shows an individual writing on the sheet of paper located on the work platform.
Figure 4:
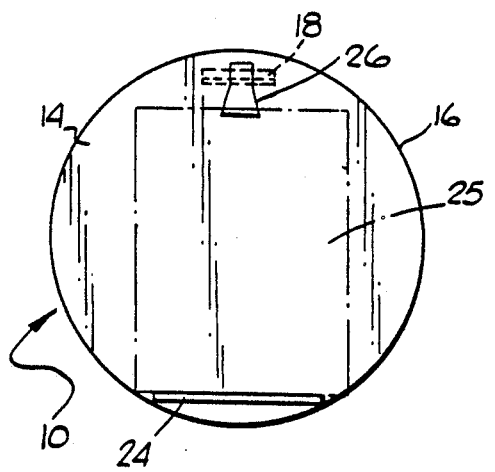
FIG. 4 is a top plan view of the work platform of the present invention which additionally illustrates a sheet of paper lying on the writing surface of the work platform.
Figure 5:
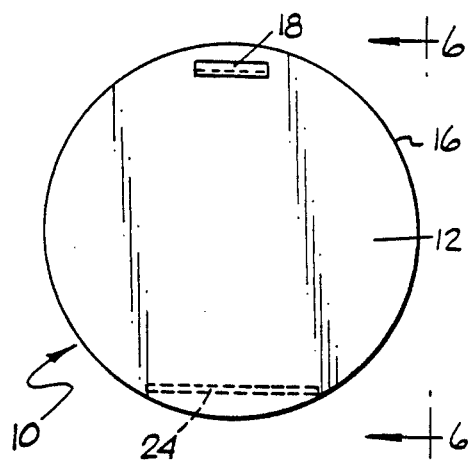
FIG. 5 is a bottom plan view of the work platform illustrated in FIG. 4.
Figure 6:
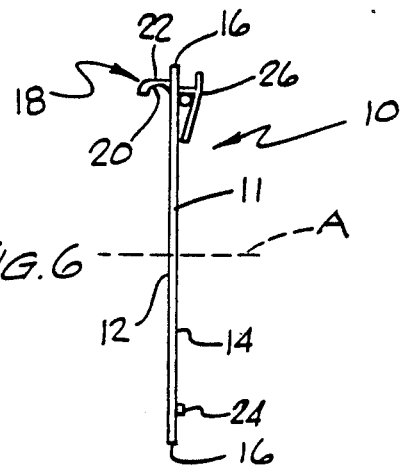
FIG. 6 is a side elevational view of the work platform of the present invention taken along Lines 6—6 of FIG. 5.

To use work platform 10 of the present invention, one simply places the work platform on the steering wheel with the work platform's underside surface 12 flat against support surface 7 of the steering wheel and with inner surface 20 of elongated member 18 resting against the rounded edge 6 of the steering wheel at the top of the steering wheel, as such is illustrated in FIG. 3. One may then place an article such as a table or a sheet of paper such as paper sheet 25 on the writing surface of the platform with the bottom edge of the sheet or tablet located against projection 24. One may also secure the sheet of paper or tablet to the platform by clipping it to the platform with clip means 26. One may then write on the paper sheet or tablet, as such is illustrated in FIG. 3.

Figures 7, 8:
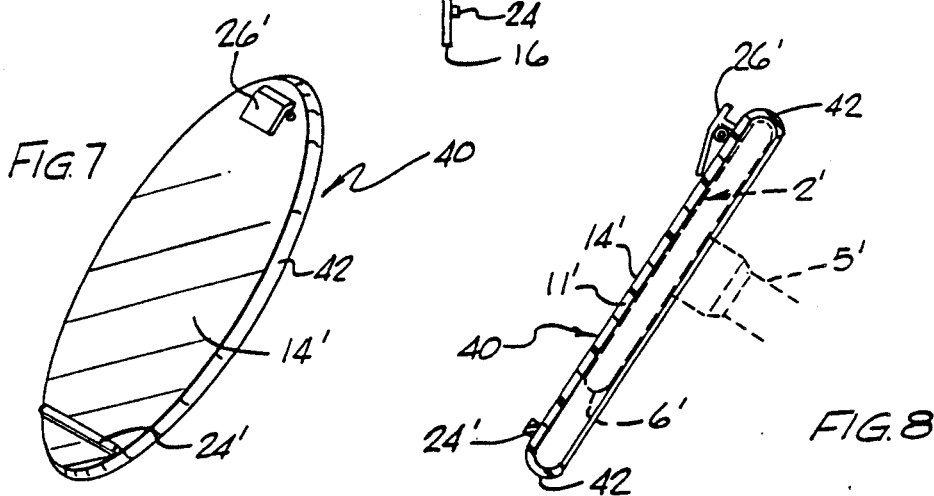
FIG. 7 is perspective view of a second embodiment of a work platform of the present invention.
FIG. 8 is a cross sectional view showing the work platform of FIG. 7 mounted on a steering wheel of a motor vehicle.

FIGS. 7 and 8 illustrate another work platform 40 of the present invention. The components of work platform which are substantially similar to those of work platform 10 are identified by the same numeral with the exception that those of work platform 40 are primed.

Work platform 40 is identical to work platform 10 with the exception that it has an arcuate edge 42 extending about the periphery of its base 11'. As such, work platform 40 has the appearance of a "Frisbee" toy flying saucer. Be that as it may, work platform 40 differs from a Frisbee in that the work platform's base 11' defines a flat and firm writing surface 14'. It will be recalled that the bases of both work platforms 10 and 40 provide a firm writing surface since they are made from a rigid material such as a hard plastic, as previously mentioned. Frisbees, on the other hand, do not provide a flat and firm writing surface since they are made from a soft plastic and have a dome-shaped base. "Frisbee" is a registered trademark of the Wham-0 Manufacturing Company of New York, N.Y.

FIG. 8 illustrates that arcuate edge 42 of work platform 40 performs the same function as securing means or elongated member 18 of work platform 10 in that it engages or rests against the rounded outer edge 6 of the steering wheel to mount the work platform on the steering wheel. As with elongated member 18, the surface of arcuate edge 42 which contacts the rounded edge of the steering wheel is concave in cross section. There is also no need for this surface to conform to the shape of rounded edge 6 of the steering wheel. It should, however, have a radius of curvature which enables it to fit over the steering wheel's rounded edge.

From the foregoing description, those skilled in the art will appreciate that the present invention provides a unique work platform for use in an automobile. Those skilled in the art will also appreciate the ease with which the platform can be mounted on the steering wheel. In addition, those skilled in the relevant art will appreciate the foldable version of the present invention which is easily stored.

Although the present invention has been described with a certain degree of particularity, it is understood that the present disclosure has been made by way of example and that changes in details of structure may be made without departing from the spirit thereof.

What is claimed is:

1. A work platform for mounting on a steering wheel of a motor vehicle wherein the steering wheel has a rounded outer edge and a support surface which generally faces a driver of the moor vehicle, said work platform comprising:
   a generally rigid base having a flat underside a top side defining a generally flat writing surface and an edge connecting said underside and said top side; and
   securing means for engaging the rounded outer edge of the steering wheel to mount said work platform on said steering wheel, said securing means including a single elongated member projecting outwardly from said underside adjacent said edge of said work platform, said securing means securing said work platform to the steering wheel when said flat underside of said work platform is located against the support surface of the steering wheel with said elongated member located against the rounded outer edge of the steering wheel at the top of the steering wheel.

2. A work platform as claimed in claim 1 wherein said rigid base has an arcuate edge extending about at least a portion of its periphery, said arcuate edge serving as said securing means.

3. A work platform as claimed in claim 1, wherein:
   said securing means includes an elongated member which is attached to said underside and which projects outwardly from said underside at approximately a right angle, said elongated member defining an inner surface facing inwardly towards the normal axis of said work platform and an outer facing surface facing away from the normal axis of said work platform, said inner surface of said elongated member being sized and configured to rest against the rounded outer edge of said steering wheel to secure said work platform to said steering wheel when said work platform is placed on said steering wheel with said underside located against the support surface of the steering wheel.

4. A work platform as claimed in claim 3, wherein:
   said inner surface of said elongated member is concave in shape so that it generally conforms to the shape of the rounded outer-edge of the steering wheel.

5. A work platform as claimed in claim 1, further comprising ledge means attached to said writing surface for preventing articles from sliding off said writing surface when said work platform is secured to the steering wheel.

6. A work platform as claimed in claim 5, wherein:
said ledge means includes a generally longitudinally extending projection which is attached to said writing surface and which projects outwardly therefrom to prevent articles from sliding off said writing surface when said work platform is secured to the steering wheel.

7. A work platform as claimed in claim 6 further comprising clip means attached to said writing surface for securing articles thereto.

8. In a motor vehicle, the improvement comprising in combination:
a steering wheel supported by at least two support legs which attach to a steering column, said steering wheel having a rounded outer edge and a support surface which generally faces a driver of the motor vehicle; and
a work platform having a generally flat and firm underside, a top side defining a generally flat writing surface, and an edge connecting aid underside and said top side with work platform also including securing means for engaging said rounded outer edge of said steering wheel to mount said writing platform on said steering wheel, said securing means including a single elongated member projecting outwardly from said underside adjacent said edge of said work platform, said securing means securing said work platform to the steering wheel when said flat underside of said work platform is located against the support surface of the steering wheel with said elongated member located against the rounded outer edge of the steering wheel at the top of the steering wheel.

9. A motor vehicle as claimed in claim 8 wherein said work platform has an arcuate edge extending about at least a portion of its periphery, said arcuate edge serving as said securing means.

10. A motor vehicle as claimed in claim 8, wherein:
said securing means includes an elongated member which is attached to said underside of said work platform and which projects outwardly from said underside at approximately a right angle, said elongated member defining an inner surface facing inwardly towards the normal axis of said work platform and an outer surface facing away from the normal axis of said platform, said inner surface of said elongated member being sized and configured to rest against said rounded outer edge of said steering wheel to secure said work platform to said steering wheel when said work platform is placed against said steering wheel with said underside lying flat against said support surface of said steering wheel.

11. A motor vehicle as claimed in claim 10, wherein:
said inner surface of said elongated member is concave in shape to generally conform to the shape of said rounded outer edge of said steering wheel.

12. A motor vehicle as claimed in claim 8, further comprising ledge means attached to said writing surface of said work platform for preventing articles from sliding off said writing surface when said work platform is mounted on said steering wheel.

13. A motor vehicle as claimed in claim 12, wherein:
said ledge means includes a generally longitudinally extending projection which is attached to said work platform and which projects outwardly therefrom to prevent articles from sliding off said writing surface when said work platform is mounted on said steering wheel.

14. A motor vehicle as claimed in claim 8 further comprising clip means attached to said writing surface of said work platform for securing articles to said writing surface.

15. A method of providing a writing surface for a motor vehicle comprising;
providing a work platform for mounting on a motor vehicle steering wheel having a rounded outer edge and a support surface which generally faces the drive of the motor vehicle, said work platform including
a generally rigid base having a flat underside, a top side defining a flat writing surface and an edge connecting the underside and top side; and
securing means for engaging the rounded outer edge of the steering wheel to secure the work platform to the steering wheel, the securing means including a single elongated member projecting outwardly from the underside of the work platform adjacent an edge of the work platform, the elongated member being sized and configured to secure the work platform to the steering wheel when the flat underside surface of the work platform is located against the support surface of the steering wheel and the single elongated member is located against the rounded outer edge of the steering wheel at the top of the steering wheel;
securing the work platform to the steering wheel by locating the underside of the work platform against the support surface of the steering wheel with the single elongated member located against the rounded outer edge of the steering wheel at the top of the steering wheel.

16. A method as claimed in claim 15 further comprising
placing an article of writing paper against the writing surface of the writing platform; and
writing on the writing paper located on the writing surface of the writing platform.

* * * * *